(12) United States Patent
Michos et al.

(10) Patent No.: US 9,234,104 B2
(45) Date of Patent: Jan. 12, 2016

(54) COMPOSITE METAL OXIDE PARTICLES AND METHODS OF MAKING AND USING THE SAME

(75) Inventors: Demetrius Michos, Clarksville, MD (US); Daniel Ray Fruge, Wilmington, DE (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 13/519,748

(22) PCT Filed: Dec. 13, 2010

(86) PCT No.: PCT/US2010/060050
§ 371 (c)(1),
(2), (4) Date: Jul. 2, 2012

(87) PCT Pub. No.: WO2011/081874
PCT Pub. Date: Jul. 7, 2011

(65) Prior Publication Data
US 2012/0285349 A1     Nov. 15, 2012

Related U.S. Application Data

(60) Provisional application No. 61/290,748, filed on Dec. 29, 2009.

(51) Int. Cl.
| | | |
|---|---|---|
| C08K 3/32 | (2006.01) | |
| B32B 5/16 | (2006.01) | |
| C09D 5/08 | (2006.01) | |
| C01B 33/18 | (2006.01) | |
| C09C 1/30 | (2006.01) | |
| C09C 1/36 | (2006.01) | |
| C09D 7/12 | (2006.01) | |
| C09C 3/06 | (2006.01) | |
| C08K 3/22 | (2006.01) | |
| C08K 3/36 | (2006.01) | |
| C08K 9/02 | (2006.01) | |

(52) U.S. Cl.
CPC ............. *C09D 5/084* (2013.01); *C01B 33/18* (2013.01); *C09C 1/3045* (2013.01); *C09C 1/3653* (2013.01); *C09C 3/06* (2013.01); *C09C 3/063* (2013.01); *C09D 7/1225* (2013.01); *C09D 7/1266* (2013.01); *C09D 7/1275* (2013.01); *C09D 7/1283* (2013.01); *C01P 2004/61* (2013.01); *C01P 2004/62* (2013.01); *C08K 3/22* (2013.01); *C08K 3/36* (2013.01); *C08K 9/02* (2013.01); *Y10T 428/2991* (2015.01)

(58) Field of Classification Search
None
See application file for complete search history.

(56) References Cited

U.S. PATENT DOCUMENTS

| | | | |
|---|---|---|---|
| 2,244,325 A | 6/1941 | Bird | 252/313 |
| 2,574,902 A | 11/1951 | Bechtold | 252/313 |
| 2,577,484 A | 12/1951 | Rule | 252/313 |
| 2,577,485 A | 12/1951 | Rule | 252/313 |
| 2,631,134 A | 3/1953 | Iler | 252/313 |
| 2,750,345 A | 6/1956 | Alexander | 252/313 |
| 2,892,797 A | 6/1959 | Alexander et al. | 252/313 |
| 3,012,972 A | 12/1961 | Rule | 252/313 |
| 3,440,174 A | 4/1969 | Albrecht | 252/313 |
| 4,157,920 A | 6/1979 | Wason et al. | 106/292 |
| 4,226,743 A | 10/1980 | Seese et al. | 252/453 |
| 5,030,286 A | 7/1991 | Crawford et al. | 106/435 |
| 5,650,002 A | 7/1997 | Bolt | 106/438 |
| 6,380,265 B1 | 4/2002 | Pryor et al. | 516/85 |
| 6,846,493 B2 | 1/2005 | Pugh et al. | 424/423 |
| 7,037,475 B2 | 5/2006 | Dokter et al. | 423/335 |
| 2003/0024437 A1 | 2/2003 | Wen et al. | 106/436 |
| 2003/0035883 A1* | 2/2003 | Nishikata et al. | 427/2.17 |
| 2003/0118694 A1 | 6/2003 | Hojo et al. | 426/74 |
| 2005/0026003 A1 | 2/2005 | Kim et al. | 428/704 |
| 2005/0069706 A1 | 3/2005 | Kessell | 428/403 |
| 2007/0280943 A1* | 12/2007 | Friedman et al. | 424/144.1 |
| 2009/0270553 A1 | 10/2009 | Reimann et al. | 524/590 |
| 2011/0280943 A1* | 11/2011 | Mansouri et al. | 424/489 |

FOREIGN PATENT DOCUMENTS

| | | |
|---|---|---|
| CN | 1600682 | 3/2005 |
| CN | 1843902 | 4/2006 |
| CN | 1931713 | 3/2007 |
| CN | 101024571 | 8/2007 |
| JP | 92020987 | 4/1992 |
| JP | 411262658 | 9/1999 |
| WO | 03/095085 | 11/2003 |

\* cited by examiner

*Primary Examiner* — Ronak Patel
(74) *Attorney, Agent, or Firm* — Beverly J. Artale

(57) ABSTRACT

Composite inorganic particles and compositions containing silica particles are disclosed. Methods of making silica particles and methods of using composite inorganic particles are also disclosed.

7 Claims, No Drawings

COMPOSITE METAL OXIDE PARTICLES AND METHODS OF MAKING AND USING THE SAME

CROSS REFERENCE TO RELATED APPLICATION

This application is a continuation of U.S. Provisional Patent Application Ser. No. 61/290,748 filed Dec. 29, 2009.

FIELD OF THE INVENTION

The present invention is directed to composite inorganic particles, compositions containing composite inorganic particles, methods of making composite inorganic particles, and methods of using composite inorganic particles.

BACKGROUND OF THE INVENTION

In various applications, metal oxide particles containing metal phosphate are highly desired. For example, coatings having metal phosphate materials may be applied to a variety of substrates for a variety of purposes such as corrosion resistance against harsh chemical environments at elevated temperatures, as fiber coatings to provide toughening of high temperature composites, as coatings for bio-active surfaces for implants, and, in general, for surface modification of a substrate to obtain desirable electrical, chemical, thermal and mechanical properties.

Efforts continue in the art to develop particles, such as metal oxide particles containing metal phosphate, having optimum properties so that the particles may be utilized in a variety of applications.

There is a need in the art for metal oxide particles containing metal phosphate that are stable in a dispersion or suspension. Moreover, there is a need in the art for metal oxide particles containing metal phosphate that are relatively small and/or uniform in size.

SUMMARY OF THE INVENTION

The present invention addresses some of the difficulties and problems discussed above by the discovery of new composite inorganic particles containing metal phosphate. The composite inorganic particles have a particle size and particle size distribution, which allows them to remain in suspension for long periods of time. Moreover, the composite inorganic particles possess a composition and structure that provide for desirable amounts of available metal phosphate that is uniformly distributed on the surface of the particles. The new composite inorganic particles are typically porous or non-porous, a metal oxide particles, and may be used as anti-corrosion agents, fillers, hardening agents, surface modification agents, and the like. The new composite inorganic particles are particularly suitable for use in anti-corrosion coatings, paints, bio-active surface coatings, protective coatings, fillers for dental implants, fillers for ceramics, dopants for glasses, and the like.

In one exemplary embodiment, a powder of composite inorganic particles of the present invention comprises metal phosphate and metal oxide wherein the particles have a metal oxide core and a coating of metal phosphate on the metal oxide core.

In another exemplary embodiment, a powder of composite inorganic particles of the present invention comprises metal oxide and metal phosphate particles having a particle size distribution such that the median particle size is less than about 50 μm. The mean particle size may be about 40 μm or less, about 30 pm or less, or from about 20 μm or less. The median particle size may range about 0.001 μm to about 50 μm, from about 0.001 μm to about 40 μm, or about 0.001 μm to about 30 μm.

In an even further exemplary embodiment, a powder of composite inorganic particles of the present invention comprises metal phosphate and metal oxide, wherein after being mixed with a liquid, forms a dispersion that remains stable for at least six months. In an alternative, embodiment, the dispersion remains stable for at least about one year.

In one exemplary embodiment, a dispersion of composite inorganic particles of the present invention comprises metal phosphate and metal oxide wherein the particles have a metal oxide core and a coating of metal phosphate on the metal oxide core.

In a further exemplary embodiment, a dispersion of composite inorganic particles of the present invention comprises metal phosphate and metal oxide wherein the dispersion remains stable for at least six months. In an alternative, embodiment, the dispersion remains stable for at least about one year.

The present invention is also directed to methods of making composite inorganic particles. In another exemplary embodiment according to the present invention, the method of making composite inorganic particles comprises providing a metal oxide particles, forming a coating of metal phosphate on the metal oxide particles.

In another exemplary embodiment according to the present invention, the method of making composite inorganic particles comprises providing metal oxide particles, forming a coating of metal phosphate on the metal oxide particles. The composite inorganic particles may have a particle size distribution such that the median particle size is less than about 50 μm.

In one exemplary embodiment according to the present invention, the method of making composite inorganic particles comprises providing metal oxide particles, forming a coating of metal phosphate on the metal oxide particles. The dispersion may remain stable for at least six months, and even up to more than a year.

The present invention is further directed to methods of using composite inorganic particles. In one exemplary method of using composite inorganic particles, the method comprises providing a powder of composite inorganic particles comprising metal phosphate and metal oxide; mixing the powder with a liquid to form a dispersion; and applying the dispersion to a substrate, wherein the particles have a metal oxide core and a coating of metal phosphate on the metal oxide core.

In another exemplary method of using composite inorganic particles, the method comprises providing a dispersion of liquid and composite inorganic particles, which comprise metal phosphate and metal oxide; and applying the dispersion to a substrate, wherein the particles have a metal oxide core and a coating of metal phosphate on the metal oxide core.

These and other features and advantages of the present invention will become apparent after a review of the following detailed description of the disclosed embodiments and the appended claims.

DETAILED DESCRIPTION OF THE INVENTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

The present invention is directed to composite inorganic particles. The present invention is further directed to methods of making composite inorganic particles, as well as methods of using composite inorganic particles. A description of exemplary composite inorganic particles, methods of making composite inorganic particles, and methods of using composite inorganic particles are provided below.

It must be noted that as used herein and in the appended claims, the singular forms "a", "and", and "the" include plural referents unless the context clearly dictates otherwise. Thus, for example, reference to "an oxide" includes a plurality of such oxides and reference to "oxide" includes reference to one or more oxides and equivalents thereof known to those skilled in the art, and so forth.

"About" modifying, for example, the quantity of an ingredient in a composition, concentrations, volumes, process temperatures, process times, recoveries or yields, flow rates, and like values, and ranges thereof, employed in describing the embodiments of the disclosure, refers to variation in the numerical quantity that can occur, for example, through typical measuring and handling procedures; through inadvertent error in these procedures; through differences in the ingredients used to carry out the methods; and like proximate considerations. The term "about" also encompasses amounts that differ due to aging of a formulation with a particular initial concentration or mixture, and amounts that differ due to mixing or processing a formulation with a particular initial concentration or mixture. Whether modified by the term "about" the claims appended hereto include equivalents to these quantities.

As used herein, the term "inorganic" means compounds that typically do not contain carbon atoms, except for some carbon containing compounds, such as for example, carbon monoxide, carbon dioxide, carbonates, cyanides, cyanates, carbides, and thyocyanates. Inorganic materials include, but are not limited to, oxides, sulfides, hydroxides, carbonates, silicates, phosphates, etc, and mixtures thereof.

As used herein, "metal oxides" is defined as binary oxygen compounds where the metal is the cation and the oxide is the anion. The metals may also include metalloids. Metals include those elements on the left of the diagonal line drawn from boron to polonium on the periodic table. Metalloids or semi-metals include those elements that are on this line. Examples of metal oxides include silica, alumina, titania, zirconia, etc., and mixtures thereof.

As used herein the term "porous particles" means particles having significant internal porosity as measured by nitrogen porisimetry, i.e., a porosity of more than about 0.05 cc/g, and the term "non-porous" means particles having little or no internal porosity, i.e., an internal porosity of less than about 0.05 cc/g. Examples of porous particles include, silica gel, precipitated silica, fumed silica, boehmite alumina, etc., and examples of non-porous particles include colloidal silica, alumina, titania, etc.

The composite inorganic particles of the present invention have a physical structure and properties that enable the composite inorganic particles to provide one or more advantages when compared to known composite inorganic particles. The present invention addresses some of the difficulties and problems discussed above by the discovery of new composite inorganic particles containing metal phosphate and metal oxide. The composite inorganic particles have properties, which provide improved stability when the composite inorganic particles are dispersed in a liquid. The composite inorganic particles have a particle size and particle size distribution, which allows them to remain in suspension for long periods of time. Moreover, the composite inorganic particles possess a composition and structure that provide for desirable amounts of available metal phosphate that is uniformly distributed on the surface of the particles. The new composite inorganic particles are typically porous or non-porous metal oxide and metal phosphate particles, and may be used as anti-corrosion agents, fillers, hardening agents, surface modification agents, and the like. The new composite inorganic particles are particularly suitable for use in anti-corrosion coatings, paints, bio-active surface coatings, protective coatings, fillers for dental implants, fillers for ceramics, dopants for glasses, and the like.

In one exemplary embodiment, a powder of composite inorganic particles of the present invention comprises metal phosphate and metal oxide wherein the particles have a metal oxide core and a coating of metal phosphate on the metal oxide core.

In another exemplary embodiment, a powder of composite inorganic particles of the present invention comprises metal oxide and metal phosphate particles having a particle size distribution such that the median particle size is less than about 50 µm. In a further exemplary embodiment, the mean particle size may be about 40 µm or less, about 30 µm or less, or from about 20 µm or less. In an even further embodiment, the median particle size may range about 0.001 µm to about 50 µm, from about 0.001 µm to about 40 µm, or about 0.001 µm to about 30 µm.

In an even further exemplary embodiment, a powder of composite inorganic particles of the present invention comprises metal phosphate and metal oxide, wherein after being mixed with a liquid, forms a dispersion that remains stable for at least six months. In an alternative, embodiment, the dispersion remains stable for at least about one year.

In one exemplary embodiment, a dispersion of composite inorganic particles of the present invention comprises metal phosphate and metal oxide wherein the particles have a metal oxide core and a coating of metal phosphate on the metal oxide core.

In a further exemplary embodiment, a dispersion of composite inorganic particles of the present invention comprises metal phosphate and metal oxide wherein the dispersion remains stable for at least six months. In an alternative, embodiment, the dispersion remains stable for at least about one year.

In one exemplary embodiment, a composite particle of the present invention comprises composite inorganic particles having a particle size distribution such that the mean particle size is about 50 µm or less. The particle size distribution may be such that the mean particle size is about 49 µm or less, about 48 µm or less, about 47 µm or less, 46 µm or less, 45 µm or less, 44 µm or less, 43 µm or less, 42 µm or less, 41 µm or less, 40 µm or less, 39 µm or less, 38 µm or less, 37 µm or less, 36 µm or less, 35 µm or less, 34 µm or less, 33 µm or less, 32 µm or less, 31 µm or less, 30 µm or less. In another exemplary embodiment, the median particle size of the composite particle may range about 0.001 µm to about 50 µm, from about 0.001 µm to about 40 µm, or about 0.001 µm to about 30 µm.

In another exemplary embodiment where porous materials are utilized, the composite inorganic particles of the present invention may have a pore volume as measured by nitrogen porosimetry of at least about 0.40 cc/g. In one exemplary embodiment of the present invention, the composite inorganic particles have a pore volume as measured by nitrogen porosimetry of from about 0.40 cc/g to about 1.4 cc/g. In another exemplary embodiment of the present invention, the composite inorganic particles have a pore volume as measured by nitrogen porosimetry of from about 0.75 cc/g to about 1.1 cc/g. An added benefit of using porous metal oxide core particles provides desirable amounts of metal phosphate that may be readily solubilized and allows for improved interaction with components in formulations made therefrom.

In one exemplary embodiment, composite inorganic particles of the present invention may have a surface area as measured by the BET nitrogen adsorption method (i.e., the Brunauer Emmet Teller method) of at least about 150 m$^2$/g. In another exemplary embodiment of the present invention, the composite inorganic particles have a BET surface area of from about 400 m$^2$/g to about 700 m$^2$/g. In a further exemplary embodiment of the present invention, the composite inorganic particles have a BET surface area of from about 450 m$^2$/g to about 500 m$^2$/g.

In another exemplary embodiment, the metal oxide core comprises any porous or nonporous particles formed via any known process including, but not limited to, a solution polymerization process such as for forming colloidal particles, a continuous flame hydrolysis technique such as for forming fused particles, a gel technique such as for forming gelled particles, and a precipitation technique such as for forming precipitated particles. The particles may be composed of inorganic materials. In one exemplary embodiment the core particles are composed of inorganic materials such as metal oxides, sulfides, hydroxides, carbonates, silicates, phosphates, etc, but are preferably metal oxides. The particles may be a variety of different symmetrical, asymmetrical or irregular shapes, including chain, rod or lath shape. The particles may have different structures including amorphous or crystalline, etc. The particles may include mixtures of particles comprising different compositions, sizes, shapes or physical structures, or that may be the same except for different surface treatments.

In one embodiment, the metal oxide core particulates comprises porous materials, such as precipitated metal oxide (e.g., silica, alumina, titania, etc.), metal oxide gel, or fumed metal oxide. As it is well known in the art, the formation of precipitated silica occurs in a reaction between waterglass and an acid via first forming a seed of primary particles which can be grown to larger particles, followed by an aggregation and then by an agglomeration of these aggregates. Depending on the reaction conditions, the agglomerates can be grown even more together by a so called reinforcement. At a certain agglomerate size and concentration, the hydrous silica begins to settle from the reaction slurry as a precipitate. To isolate the hydrous silica from the slurry and to remove the reaction electrolyte from the crude silica, the precipitate is filtered from the slurry and washed. The resulting filter cake then is dried using drying equipment as known in the art. Depending on the method and extend of drying, a stiffening of the silica structure will occur during the drying step in which irreversible Si—O—Si-links are formed from initial silanol groups. Processes for making precipitated metal oxides include those set forth in U.S. Pat. Nos. 7,037,475B1; 5,030,286 and 4,157,920, the entire subject matter of which is incorporated herein by reference. In a further embodiment of the present invention, the metal oxide particles stem from the primary particles, grown particles, aggregated particles, agglomerated particles or the filter cake of a general metal oxide precipitation process as described above.

Methods of preparing metal oxide gels are well known in the art and include those set forth in U.S. Pat. No. 6,380,265, the entire subject matter of which is incorporated herein by reference. For example, a silica gel is prepared by mixing an aqueous solution of an alkali metal silicate (e.g., sodium silicate) with a strong acid such as nitric or sulfuric acid, the mixing being done under suitable conditions of agitation to form a clear silica sol which sets into a hydrogel, i.e., macrogel, in less than about one-half hour. The resulting gel is then washed. The concentration of metal oxide, i.e., SiO$_2$, formed in the hydrogel is usually in the range of about 10 and about 50 weight percent, with the pH of that gel being from about 1 to about 9, preferably 1 to about 4. A wide range of mixing temperatures can be employed, this range being typically from about 20 to about 50° C. The newly formed hydrogels are washed simply by immersion in a continuously moving stream of water which leaches out the undesirable salts, leaving about 99.5 weight percent or more pure metal oxide behind. The pH, temperature, and duration of the wash water will influence the physical properties of the silica, such as surface area (SA) and pore volume (PV). Silica gel washed at 65-90° C. at pH's of 8-9 for 15-36 hours will usually have SA's of 250-400 and form aerogels with PV's of 1.4 to 1.7 cc/gm. Silica gel washed at pH's of 3-5 at 50-65° C. for 15-25 hours will have SA's of 700-850 and form aerogels with PV's of 0.6-1.3. These measurements are generated by N$_2$ porosity analysis. Methods for preparing metal oxide gels such as alumina and mixed metal oxide gels such as silica/alumina cogels are also well known in the art. Methods for preparing such gels are disclosed in U.S. Pat. No. 4,226,743, the contents of which are incorporated by reference. In general, alumina gels are prepared by mixing alkali metal aluminates and aluminum sulfate. Cogels are prepared by cogelling two metal oxides so that the gels are composited together. For example, silica alumina cogels can be prepared by gelling an alkali metal silicate with an acid or acid salt, and then adding alkali metal aluminate, aging the mixture and subsequently adding aluminum sulfate. The gel is then washed using conventional techniques.

In another exemplary embodiment, the metal oxide particles comprise nonporous metal oxides, such as colloidal metal oxide particles. Colloidal metal oxides include those particles originating from dispersions or sols in which the particles do not settle from dispersion over relatively long periods of time. Such particles are typically below one micron in size. Colloidal metal oxides having an average particle size in the range of about 1 to about 300 nanometers and processes for making the same are well known in the art. See U.S. Pat. Nos. 2,244,325; 2,574,902; 2,577,484; 2,577,485; 2,631,134; 2,750,345; 2,892,797; 3,012,972; and 3,440,174, the contents of which are incorporated herein by reference. In an exemplary embodiment, the colloidal metal oxide particles may be colloidal silicas having average particle sizes in the range of 5 to 100 nanometers. Colloidal silicas can have a surface area (as measured by BET) in the range of 9 to about 2700 m$^2$/g.

In one exemplary embodiment, the metal oxide core particles possess a mean particle size of about 40 μm or less, about 30 μm or less, or about 20 μm or less. In another exemplary embodiment, the metal oxide core particles possess a median particle size range from about 0.001 μm to about 50 μm, from about 0.001 pm to about 40 μm, or from about 0.001 μm to about 30 μm. In a further exemplary embodiment, the metal oxide core particles possess a mean particle size of about 10 microns or less, or about 9, 8, 7, 6, 5, 4, 3, 2 or even 1 microns or less.

In an exemplary embodiment, the composite inorganic particles include the metal oxide core with a coating comprising metal phosphate formed thereon. The coating may be continuous or discontinuous. In one embodiment, the metal phosphate may be calcium phosphate. The amount of metal phosphate deposited on the metal oxide core varies depending on the reaction conditions. For example, in one embodiment, the composite inorganic particles comprise weight of metal to weight of metal oxide ratio (wtM/wtMO$_x$) of about 0.001 to about 0.5 in the composite inorganic particles, or from about 0.001 to about 0.4, or from about 0.001 to about 0.3, or even from about 0.001 to about 0.2.

The present invention is also directed to methods of making composite inorganic particles. In one exemplary embodiment according to the present invention, the method of making composite inorganic particles comprises providing metal oxide particles, forming a coating of metal phosphate on the metal oxide particles.

In another exemplary embodiment according to the present invention, the method of making composite inorganic particles comprises providing metal oxide particles, forming a coating of metal phosphate on the metal oxide particles. The composite inorganic particles may have a particle size distribution such that the median particle size is less than about 50 μm. In one exemplary embodiment, the metal oxide core particles possess a mean particle size of about 40 μm or less, about 30 μm or less, or about 20 μm or less. In another exemplary embodiment, the metal oxide core particles possess a median particle size range from about 0.001 μm to about 50 μm, from about 0.001 μm to about 40 μm, or from about 0.001 μm to about 30 μm.

In one exemplary embodiment according to the present invention, the method of making composite inorganic particles comprises providing metal oxide particles, forming a coating of metal phosphate on the metal oxide particles. The dispersion may remain stable for at least six months, and even up to more than a year.

In one embodiment, the metal oxide particles are formed prior to formation of the composite inorganic particles. Raw materials used to form the metal oxide particles and composite inorganic particles of the present invention, as well as method steps for forming the metal oxide particles and composite inorganic particles of the present invention are discussed below.

The methods of making metal oxide particles of the present invention may be formed from a number of metal oxide-containing raw materials. For example, suitable raw materials for making silica include, but are not limited to, metal silicates, such as alkali metal silicates. Depending on what metal oxide particle is selected for the core material (e.g., colloidal, fumed, precipitated, gel, etc.), the reactants and process conditions will vary as set forth herein.

For example, if silica gel is selected as the metal oxide core particles, they are prepared by the above-mentioned process for making gels. After washing, the gel is dried. Drying rate has an effect on the surface area and pore volume of the final metal oxide particles. In one exemplary embodiment, the drying step comprises spreading a decanted volume or filter cake of silica product into a tray so as to form a silica cake thickness of about 1.25 cm; placing the tray containing the silica cake in a gravity convection oven for about 20 hours at an oven temperature of about 140° C.; removing the tray and silica from the oven; and collecting the silica. The dried silica material is then milled and/or classified to prepare a powder having a mean particle size of about 50 μm or less. In one exemplary embodiment, the metal oxide core particles possess a mean particle size of about 40 μm or less, about 30 μm or less, or about 20 μm or less. In another exemplary embodiment, the metal oxide core particles possess a median particle size range from about 0.001 μm to about 50 μm, from about 0.001 μm to about 40 μm, or from about 0.001 μm to about 30 μm. The particles are then ready for subsequent preparation of the composite inorganic particles.

In another exemplary embodiment according to the present invention, the method of making composite inorganic particles comprises forming a dispersion of metal oxide core particles and adding solutions of metal salts and phosphate salts thereto at a basic pH (e.g., 7-14) while stirring the mixture. The mole ratio of metal salt to phosphate salt may be any range, but in the range of 1.0 to 2.0. The metal and phosphate reagents may be added over a period of time, e.g., up to several hours, but is typically less than one hour. The basic pH is maintained during the reaction with the appropriate bases, including but not limited to, potassium hydroxide, sodium hydroxide, ammonium hydroxide, etc., or mixtures thereof. The resulting slurry is washed and filtered/ultrafiltered in order to remove any salts formed during the reaction. In exemplary embodiments where the composite inorganic particles are nano-particles, the resulting slurry is stable for long periods of time, even for more than one year. The metal content for the metal component in the resulting composite inorganic particles ranges from about 0.01 to about 0.50 based on the weight of metal oxide in the composite inorganic particles. The solids content in the resulting composite inorganic particle dispersions range from about 1 to about 40 wt % based on the total weight of the dispersion. In an alternative exemplary embodiment, the dispersions comprising composite inorganic particulates are drained to form a filter cake and then dried, or are simply spray dried.

The present invention is further directed to methods of using composite inorganic particles. The composite inorganic particles may be used in a variety of applications, including as anticorrosion agents in anticorrosion coating applications, as pigments for other coating applications, as filler in biocompatible or ceramic applications, as an active component in dental cements, as a hardener in protective coatings, as a surface modifier in coatings for surface modification of a substrate to obtain desirable electrical, chemical, thermal and mechanical properties, and the like. In one exemplary method of using metal oxide particles, the method comprises providing a powder of composite inorganic particles comprising metal phosphate and metal oxide; mixing the powder with a liquid to form a dispersion; and applying the dispersion to a substrate, wherein the particles have a metal oxide core and a coating of metal phosphate on the metal oxide core. In another exemplary method of using composite inorganic particles, the method comprises providing a dispersion of liquid and composite inorganic particles, which comprise metal phosphate and metal oxide; and applying the dispersion to a substrate, wherein the particles have a metal oxide core and a coating of metal phosphate on the metal oxide core. The composite inorganic particles may have a particle size distribution such that the median particle size is less than about 50 μm. The dispersion may include various other components and/or be utilized in other formulations depending upon the desired application. For example, if the composite inorganic particles are intended for use in an anticorrosion coating formulation, the composite inorganic particles are added to the formulation as powder, dispersions or pastes. If the composite metal particles are utilized in dental cements, they may be added as powder, dispersions or pastes.

The advantages of the composite inorganic particles of the present invention is provided by a particle size and particle size distribution, which allows them to remain in suspension for long periods of time. Moreover, the composite inorganic particles possess a composition and structure that provide for desirable amounts of available metal phosphate that is uniformly distributed on the surface of the particles.

EXAMPLES

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims. The following examples reference silica, but any metal oxide may be utilized in the present invention. In addition, even though calcium phosphate is referenced in the Examples, any metal phosphate may be utilized in the present invention.

Example 1

The colloidal silica is made using the process set forth in U.S. Pat. No. 2,631,134. In this example, the reaction is carried out by the simultaneous addition of silicate and resin to a reaction vessel while continuously withdrawing the silica sol thus formed. The reaction is carried out in a four liter stainless steel beaker with an overflow pipe, which maintains the contents of the beaker at two liters; at the outset the beaker is filled with water. A solution of sodium silicate (3.25 $SiO_2$: $Na_2O$, 10 per cent $SiO_2$) is fed into the beaker at a rate of 25 ml./min. Simultaneously wet, drained "Amberlite® IRC-50" (hydrogen form) is fed into the beaker at such a rate as to maintain the pH at 9⁻±0.3. The temperature is maintained at about 60° C. The system is vigorously stirred during silicate addition. The overflow is dropped onto a filter and filtered immediately, the first two liters of filtrate being discarded. The addition of resin and silicate is continued for several hours. The product is a silica sol having a particle size of 12 nm, pH of about 9, a $SiO_2$:$Na_2O$ ratio of about 100:1, and containing about ten percent $SiO_2$. The sol is then concentrated to 40 percent silica by evaporation at 100° C. 600 g of the colloidal silica slurry (40% $SiO_2$) is placed in a beaker. To this, three separate reagents are added at the same time with good mixing using a conventional beaker mixer. All additions are performed at room temperature. The first reagent (2000 g) added to the mixture is a 3 wt % solution of $Ca(NO_3)_2.4H_2O$ (based on the weight of the solution). The second reagent (1200 g) added to the mixture is a 3 wt % solution of $Na_2HPO_4$. The third reagent added to the mixture is a 2 wt % solution of NaOH. The calcium and phosphate reagents are added at such a rate as to add the full amounts in 40 minutes. The pH is maintained at 9.5 by the appropriate addition of NaOH, in this example, 355 g of the above-mentioned 2 wt % solution of NaOH are used. Once all of the reagents are added and the reaction is complete, the slurry is ultrafiltered in order to remove salts generated during the reaction. The final composite calcium phosphate silica particle dispersion is stable (i.e., the particles do not precipitate) and the particles possess a Ca/P mole ratio of 1.67 and a wtCa/wtSiO2 of 0.04. The pH of the dispersion is 9.4 and the solids content is 21.3 wt % based on the total weight of the dispersion (obtained by drying at 205° C. to constant weight). The dispersion remains stable for at least six months.

Example 2

The process of Example 1 is repeated but using half of the amounts of calcium nitrate and sodium phosphate. These reagents are added over a period of 19 minutes. The final composite calcium phosphate silica particle dispersion is stable and the particles possess a Ca/P mole ratio of 1.68 and a wtCa/wtSiO$_2$ of 0.02. The pH of the dispersion is 9.3 and the solids content is 19.2 wt % based on the total weight of the dispersion. The dispersion remains stable for at least six months.

Example 3

The process of Example 1 is repeated but using 800 g of 7 nm colloidal silica slurry (30% SiO2) prepared by the process recited in Example 1. The smaller particles are formed by using less reaction time and the lower solids is provided using less evaporation time. The other amounts of reactants utilized are the same as those set forth in Example 1. The final composite calcium phosphate silica particle dispersion is stable and the particles possess a Ca/P mole ratio of 1.71 and a wtCa/wtSiO$_2$ of 0.04. The pH of the dispersion is 9.5 and the solids content is 21.6 wt % based on the total weight of the dispersion. The dispersion remains stable for at least six months.

Example 4

The process of Example 3 is repeated but using half of the amounts of calcium nitrate and sodium phosphate. The other amounts of reactants utilized are the same as those set forth in Example 1. The final composite calcium phosphate silica particle dispersion is stable and the particles possess a Ca/P mole ratio of 1.99 and a wtCa/wtSiO$_2$ of 0.02. The pH of the dispersion is 9.5 and the solids content is 21.6 wt % based on the total weight of the dispersion. The dispersion remains stable for at least six months.

Example 5

Silica gel is made according to the process recited herein and in U.S. Pat. No. 6,380,265. For example, silica gel is prepared by mixing an aqueous solution of an alkali metal silicate (e.g., sodium silicate) with a sulfuric acid, the mixing being done under suitable conditions of agitation to form a clear silica sal which sets into a hydrogel, i.e., macrogel, in less than about one-half hour. The resulting gel is then washed. The concentration of metal oxide, i.e., $SiO_2$, formed in the hydrogel is usually in the range of about 19 weight percent, with the pH of that gel being from about 1.5. A wide range of mixing temperatures can be employed, this temperature being about 27° C. The newly formed hydrogels are washed simply by immersion in a continuously moving stream of water which leaches out the undesirable salts, leaving about 99.5 weight percent or more pure metal oxide behind. Silica gel is washed at about 80° C. at a pH of about 8 for about 25 hours. The silica gel is drained, dried and then milled to form a powder having a surface area of 270 m$^2$/g, a pore volume of 1.2 cc/g and a median particle size of 6 microns. 528 g of the silica powder is dispersed in 792 g of deionized water and the pH is adjusted to 9.5 with 2 wt % sodium hydroxide. All additions are performed at room temperature. Then 2200 g of 3 wt % of $Ca(NO_3)_2.4H_2O$ and 880 g of 3 wt % of $Na_2HPO_4$ is added simultaneously over a period of 39 minutes. The pH of the slurry is maintained at 9.5 by the appropriate addition of 2 wt % NaOH. 517 g of 2 wt % NaOH are used for this purpose. Then the slurry is filtered and washed three times with 550 mL. of deionized water. The filter cake is redispersed in deionized water and then spray dried. The final powder has a wtCa/wtSiO2 of 0.06.

These Examples demonstrate that the composite inorganic (e.g., metal phosphate metal oxide) particles of the present invention provide stable particle dispersions having sufficient amount of metal phosphate therein. These dispersions produce desirable formulations having advantageous levels of metal phosphate, which may be utilized in a variety of applications, including but not limited to, medical, dental, anticorrosion, and paint applications.

While the invention has been described with a limited number of embodiments, these specific embodiments are not intended to limit the scope of the invention as otherwise described and claimed herein. It may be evident to those of ordinary skill in the art upon review of the exemplary embodiments herein that further modifications, equivalents, and variations are possible. All parts and percentages in the examples, as well as in the remainder of the specification, are by weight unless otherwise specified. Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, $R_L$, and an upper limit $R_U$, is disclosed, any number R falling within the range is specifically disclosed. In particular, the following numbers R within the range are specifically disclosed: $R = R_L + k(R_U - R_L)$, where k is a variable ranging from 1% to 100% with a 1% increment, e.g., k is 1%, 2%, 3%, 4%, 5%. . . . 50%, 51%, 52%. . . . 95%, 96%, 97%, 98%, 99%, or 100%. Moreover, any numerical range represented by any two values of R, as calculated above is also specifically disclosed. Any modifications of the invention, in addition to those shown and described herein, will become apparent to those skilled in the art from the foregoing description and accompanying drawings. Such modifications are intended to fall within the scope of the appended claims.

What is claimed is:

1. A dispersion of composite inorganic particles comprising:
   a liquid; and
   composite inorganic particles dispersed throughout said liquid, said composite inorganic particles comprising (i) a silica core[1] and (ii) a coating comprising a metal phosphate formed thereon, wherein the metal phosphate comprises calcium phosphate, magnesium phosphate, or mixtures thereof, wherein the dispersion comprises from about 1 to about 40 wt % solids based on a total weight of the dispersion and the dispersion has a pH of from 9 to 14.

2. The dispersion of claim 1, wherein the metal phosphate comprises calcium phosphate.

3. The dispersion of claim 1, wherein the metal oxide comprises nano-particles.

4. The dispersion of claim 1, wherein the composite inorganic particles comprise a weight ratio of (i) metal of said metal phosphate to (ii) weight of silica of about 0.001 to about 0.5.

5. The dispersion of claim 1, wherein the dispersion has a pH of from 9.3 to 9.5.

6. The dispersion of claim 1, wherein the composite inorganic particles have a median particle size ranging from about 0.001 μm to about 50 μm.

7. The dispersion of claim 1, wherein the metal phosphate comprises magnesium phosphate.

* * * * *